3,086,976
BENZOIC ACID DERIVATIVES AND PROCESS FOR PRODUCING SAME

Joseph Borsy, Boris Dumbovich, and Laszlo Vargha, Budapest, Lajos Farkas, Debrecen, and Janos Kuszmann and Endre Kastreiner, Budapest, Hungary, assignors to Egyesult Gyogyszer- es Tapszergyar, Budapest, Hungary, a firm
No Drawing. Filed Jan. 18, 1960, Ser. No. 2,809
Claims priority, application Hungary Jan. 23, 1959
4 Claims. (Cl. 260—247.7)

The invention relates to new, therapeutically useful benzoic acid derivatives, having a tranquillizing or ataractic effect.

It has been found that amides of the trimethoxy benzoic acid in which the nitrogen of the amide is a member of a morpholine ring have a tranquillizing or ataractic effect. Suitable benzoic acid derivatives are 3,4,5-trimethoxy benzoic acid, 2,3,4-, and 2,4,5-trimethoxy benzoic acids. Amines suitable for the preparation of the compound according to the invention are morpholine (tetrahydro-1,4-oxazine) as well as methyl morpholine. Accordingly the invention relates to compounds having the formula

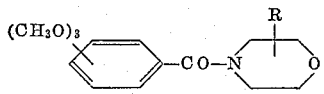

wherein the three methoxy groups are located in a position selected from the group consisting of the 2,3,4-, 2,4,5-, and 3,4,5-positions of the aromatic ring, and wherein R is selected from the group consisting of hydrogen and methyl radicals in a position selected from the group consisting of the 2- and 3-positions of the morpholine ring. The above said cyclic secondary amides of trimethoxy benzoic acids can be produced by any process known in the art. The derivatives of the said trimethoxy benzoic acid suitable to form with the morpholines mentioned above the corresponding acid amides are the acid halids, esters or azides of the trimethoxy benzoic acid. The reaction may be carried out in an inert solvent such as benzene, chloroform, but the reaction may be also carried out without solvents. If in the course of the reaction acid is set free, the starting secondary amine may be used for binding same. Also tertiary amines such as triethyl amine can be used as acid binding agent. The resulting reaction product can be separated in a known manner e.g. by filtration or evaporation and by crystallization from the reaction mixture.

The new amides of the trimethoxy benzoic acid are therapeutically very valuable tranquillizers of reduced toxicity. E.g. 3,4,5-trimethoxybenzoylmorpholine with peroral administration proves half as toxic, but twice as active, as 2 methyl-2-n-propyl-1,3-propandioldicarbamate (Meprobamate), a drug which serves in medicine for similar purposes. A further advantage, practically far more important, of the said morpholide is that, contrasted with other ataractics, it hardly influences the righting reflexes and the coordination of motions. This fact renders the drug highly suitable for using it as daytime sedative. A third advantageous property of the drug lies in that it brings about sedation without interfering with reflex irritability. A comparison of the pharmacological properties of N-(3,4,5-trimethoxy-benzoyl)-morpholine (Compound V-7) and Meprobamate is given in the following table:

| Animal species | Compound | Route of administration | $LD_{50}$, mg./kg. | $ED_{50}$, mg./kg. | $LD_{50}/ED_{50}$ |
|---|---|---|---|---|---|
| Mouse | V-7 | i.p | 1,320 | 88 | 14.8 |
| Do | V-7 | per os | 3,300 | 105 | 31.4 |
| Do | Meprobamate | i.p | 680 | 92 | 7.4 |
| Do | do | per os | 920 | 200 | 4.6 |

In order that the invention may be well understood, the following examples are given by way of illustration only:

Example 1

Preparation of N-(3,4,5-trimethoxybenzoyl)-morpholine: 46 g. 3,4,5-trimethoxybenzoyl chloride are dissolved in 300 ml. anhydrous benzene, 25 g. triethylamine and thereafter 19 g. anhydrous morpholine are added in small portions under ice-cooling. The solution is boiled for 2 hours under reflux. The precipitate is filtered off, and then the solution is washed with dilute sulfuric acid, then with sodium hydrogencarbonate solution and finally with water, then it is evaporated. The residual yellow oil soon crystallizes, the crystalline mass is taken up with ether, filtered and then recrystallized from 90% ethanol, from which it separates in prisms. It is slightly soluble in water. Yield: 80%, M.P. 120–122° C.

Example 2

Preparation of N-(2,3,4-trimethoxybenzoyl)-morpholine: 10.23 g. 2,3,4-trimethoxybenzoyl chloride is dissolved in 65 ml. benzene and under cooling and stirring a mixture of 4.5 ml. morpholine and 7 ml. triethylamine is added drop by drop. The reaction mixture is boiled for 2 hours, cooled, filtered and the solvent is driven off in vacuo. The residue is recrystallized twice from water by clarifying with charcoal. 7.22 g. N-(2,3,4-trimethoxybenzoyl)-morpholine are obtained. M.P. 84–86° C.

Example 3

For the preparation of N-(2,4,5-trimethoxybenzoyl)-morpholine 10 g 2,4,5-trimethoxy benzoyl acid chloride is dissolved in 100 ml. dry benzene and 10 g. (2.5 mol.) morpholine dissolved in 100 ml. dry benzene is added under cooling. After standing for a night at room temperature, the precipitated morpholine hydrochloride is filtered off, the benzene is removed and the residue is distilled in vacuo. Boiling point: 160–162° C. at 0.07 mm. Yield: 9.5 g. (85%) of a viscous yellow syrup which is dissolved in some benzene by heating; at cooling, crystalline morpholide is separated. The separation is completed by adding ether, then it is filtered and washed with ether, 8.5 g. yellowish-green crystals are obtained. M.P. 91–92° C., yield 70%. The substance is silghtly soluble in water.

Example 4

Preparation of N-(3,4,5-trimethoxy-benzoyl)-morpholine: A mixture of 10.6 g. 3,4,5-trimethoxybenzoic acid, 50 ml. anhydrous toluene, 4.4 ml. morpholine and 4.4 ml. $PCl_3$ are refluxed for 4 hours. The solvent is then removed in vacuo and the residue triturated with 10% sodium carbonate solution. The precipitated yellow powder is filtered off and recrystallized from water. Yield: 9.55 g. N-(3,4,5-trimethoxybenzoyl)-morpholine. M.P.

120–122° C. After extraction of the mother liquor with benzene a further crop of 0.22 g. can be obtained.

*Example 5*

Preparation of N-(3,4,5-trimethoxybenzoyl)-2-methyl-morpholine: 23.1 g. 3,4,5-trimethoxybenzoyl chloride is dissolved in 120 ml. anhydrous benzene and 11 ml. 2-methylmorpholine, thereafter 17 ml. triethylamine is added drop by drop at 0° C. and then the reaction mixture is boiled for 3 hours under reflux. After cooling, the precipitate is filtered off, the filtrate is washed with dilute hydrochloric acid and then with sodium hydrogen carbonate solution; the benzene layer is dried over anhydrous potassium carbonate and after removal of the drying agent the solution is evaporated. The residue recrystallized three times from diluted alcohol yields 12.5 g. N - (3,4,5 - trimethoxybenzoyl) - 2 - methylmorpholine. M.P. 115–117° C.

We claim:
1. N-(3,4,5-trimethoxy-benzoyl)-morpholine.
2. N-(2,3,4-trimethoxy-benzoyl)-morpholine.
3. N-(2,4,5-trimethoxy-benzoyl)-morpholine.
4. N-(3,4,5-trimethoxy-benzoyl)-2-methyl-morpholine.

References Cited in the file of this patent
UNITED STATES PATENTS

| | | |
|---|---|---|
| 1,939,496 | Guggenheim | Dec. 12, 1933 |
| 2,744,916 | Sahyun et al. | May 8, 1956 |

FOREIGN PATENTS

| | | |
|---|---|---|
| 403,892 | Great Britain | Jan. 4, 1934 |

OTHER REFERENCES

Chemical Abstracts, volume 49, pages 322–323c (1955), abstracting Hejno et al., Chem. Listy, volume 47, pages 601–612 (1953).